United States Patent
Rakshit (10) Patent No.: US 11,348,589 B2
(45) Date of Patent: May 31, 2022

(54) AUTOMATIC CONTEXTUAL SELECTION OF A SMART DEVICE

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 197 days.

(21) Appl. No.: 16/738,518

(22) Filed: Jan. 9, 2020

(65) Prior Publication Data

US 2021/0217423 A1 Jul. 15, 2021

(51) Int. Cl.
*G10L 17/00* (2013.01)
*G06N 5/02* (2006.01)

(52) U.S. Cl.
CPC .............. *G10L 17/00* (2013.01); *G06N 5/022* (2013.01)

(58) Field of Classification Search
CPC .......... G10L 17/00; G10L 15/22; G06N 5/022
See application file for complete search history.

(56) References Cited

U.S. PATENT DOCUMENTS

| | | | |
|---|---|---|---|
| 10,134,399 B2 | 11/2018 | Lang et al. | |
| 2015/0319309 A1* | 11/2015 | Cunico | G06F 40/40 379/202.01 |
| 2016/0155443 A1* | 6/2016 | Khan | G06F 1/3203 704/275 |
| 2018/0300103 A1* | 10/2018 | Bjorkengren | G10L 15/22 |
| 2018/0342151 A1* | 11/2018 | VanBlon | G06F 3/167 |
| 2019/0005960 A1* | 1/2019 | Naravanekar | G06F 3/167 |
| 2019/0034405 A1* | 1/2019 | Ivan | G06F 40/211 |

(Continued)

FOREIGN PATENT DOCUMENTS

CN 108702313 10/2018

OTHER PUBLICATIONS

Anonymous,"What devices are in my home network setup?", https://www.fing.com/news/what-devices-in-home-network-setup, accessed Aug. 13, 2019, 8 pages.

(Continued)

*Primary Examiner* — Abdelali Serrou
(74) *Attorney, Agent, or Firm* — Daniel Yeates; Andrew D. Wright; Roberts Calderon Safran & Cole, P.C.

(57) ABSTRACT

Systems and methods for automatically selecting a smart device based on the context of a voice command event are disclosed. In embodiments, a smart device controller receives a user voice command from a user regarding a function to be performed during a command event within a smart environment; determines context data associated with the user voice command; determines a smart device name of the user voice command; accesses a knowledge database including registered smart devices and associated context-specific names, wherein the context-specific names are associated with context parameters; matches the smart device name of the user voice command with one of the context-specific names of the knowledge database; automatically chooses a select smart device from the plurality of registered smart devices to perform the function based on the matching; and initiates the function at the select smart device.

20 Claims, 5 Drawing Sheets

| User ID | Smart Device ID | Device Location Data | Context-Specific Names |
|---|---|---|---|
| User A | Brand X 55 Inch TV | Zone 1 | Brand X TV; Bedroom TV; This room's TV; My TV |
| | Brand Y 65 Inch TV | Zone 2 | Brand Y TV; Living Room TV; Living Room Television; Family TV; This room's TV; Family Television |
| | Brand Z Home Speaker | Zone 2 | Bedroom Speaker; Speaker; Music Player; Sound System |
| | | Zone 5 | Office Speaker; Speaker; My Music Player |
| User B | Brand X 55 Inch TV | Zone 1 | Brand X TV; User A's TV |
| | Brand Y 65 Inch TV | Zone 2 | Brand Y TV; Living Room TV; Family TV |
| | Brand Z Home Speaker | Zone 1 | Home Speaker; Speaker; Main Speaker; Sound System |

(56) References Cited

U.S. PATENT DOCUMENTS

2019/0035398 A1    1/2019  Choi et al.
2019/0355365 A1*  11/2019  Kim ........................ G10L 17/12
2020/0092376 A1*  3/2020  Morris .................. H04L 41/082

OTHER PUBLICATIONS

Margaret Rouse, "contextual computing", https://searchmobilecomputing.techtarget.com/definition/contextual-computing?vgnextfmt=print, Jan. 27, 2014, 1 page.
Anonymous, "Device Detection", https://deviceatlas.com/device-detection, accessed Aug. 13, 2019, 2 pages.
Anonymous, "Smart-Voice Invocation of Scenes in Home-Automation Systems", IP.com, Dec. 13, 2017, 11 pages.

* cited by examiner

AUTOMATIC CONTEXTUAL SELECTION OF A SMART DEVICE

BACKGROUND

Aspects of the present invention relate generally to smart device systems and, more particularly, to automatically selecting a smart device to perform a function based on the context of a voice command event.

Intelligent systems for smart environments are increasingly utilized for home or business automation and generally include one or more smart controllers and smart devices (e.g., internet-of-things (IOT) devices) controlled by the smart controller(s). Such intelligent systems may control several different onsite smart devices of the same type (e.g., same device type), such as a plurality of smart televisions. One example of an intelligent system is an artificial intelligence (AI) voice response system (personal assistant device) including a smart controller for initiating various functions of smart devices within a home or business. Such smart controllers may receive sensor data from smart device sensors within the smart environment.

SUMMARY

In an aspect of the invention, a computer-implemented method includes: receiving, by a smart device controller, a user voice command from a user regarding a function to be performed during a command event within a smart environment, the smart environment including a plurality of registered smart devices; determining, by the smart device controller, context data associated with the user voice command; determining, by the smart device controller, a smart device name of the user voice command; accessing, by the smart device controller, a knowledge database including the registered smart devices and associated context-specific names for the registered smart devices, wherein the context-specific names are associated with context parameters; matching, by the smart device controller, the smart device name of the user voice command with one of the context-specific names of the knowledge database based on the context data matching the context parameters associated with the one of the context-specific names; automatically choose, by the smart device controller, a select smart device from the plurality of registered smart devices to perform the function based on the matching the smart device name with the one of the context-specific names; and initiating, by the smart device controller, the function at the select smart device.

In another aspect of the invention, there is a computer program product including one or more computer readable storage media and program instructions collectively stored on the one or more computer readable storage media. The program instructions are executable by a computing device to cause the computing device to: receive a user command from a user regarding a function to be performed during a command event within a smart environment, the smart environment including a plurality of registered smart devices; identify the user; determine context data and a smart device name associated with the user command; access data of the identified user in a knowledge database, wherein the knowledge database includes data for multiple users including data regarding the registered smart devices and associated context-specific names for the registered smart devices, wherein the context-specific names are associated with context parameters; match the smart device name with one of the context-specific names based on the context data matching the context parameters associated with the one of the context-specific names; automatically choose a select smart device from the plurality of registered smart devices to perform the function based on the matching the smart device name with the one of the context-specific names; and initiate the function at the select smart device.

In another aspect of the invention, there is a system including a processor, a computer readable memory and one or more computer readable storage media associated with a computing device. The system includes: program instructions to receive a user command from a user regarding a function to be performed during a command event within a smart environment, the smart environment including a plurality of registered smart devices in communication with the computing device; program instructions to determine relative locations of the plurality of registered smart devices within the smart environment; program instructions to determine context data and a smart device name associated with the user command; program instructions to access data of the user in a knowledge database including data regarding the registered smart devices and associated context-specific names for the registered smart devices, wherein the context-specific names are associated with context parameters; program instructions to match the smart device name with one of the context-specific names based on the context data matching the context parameters associated with the one of the context-specific names; program instructions to automatically choose a select smart device from the plurality of registered smart devices to perform the function based on the matching the smart device name with the one of the context-specific names; and program instructions to initiate the function at the select smart device. The program instructions are collectively stored on the one or more computer readable storage media for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to smart device systems and, more particularly, to automatically selecting a smart device to perform a function based on the context of a voice command event. In embodiments, a smart device controller analyzes voice command and context data from historic voice command events utilizing machine learning techniques to determine what users are calling each smart device in a smart environment for a given contextual situation. The smart device controller generates and updates a knowledge database (knowledge corpus) of context-specific names for each of the smart devices, enabling the smart device controller to automatically choose the correct smart device to control in a given situation based on the context of a user voice command event (e.g., location of the user, location of the smart device, identity of the user, time of day, etc.). In embodiments, a machine learning module of the smart device controller creates the knowledge database by correlating voice command data with a given contextual situation.

In embodiments, a data collection module of a smart device controller gathers voice command event data over time including: user voice command content to execute an action in a smart device; the action executed by the smart device controller; a user reaction to the action (e.g., manual correction of the action or alternative commands submitted after the action); user spoken texture and tone analysis (e.g., voice recognition parameters); different names of smart devices utilized by users; contextual surroundings of a voice command event (e.g., time of day, location of user, etc.).

In embodiments, an artificial intelligence (AI) voice response system of a smart device controller identifies during a voice command event: (a) if a user is asking for any activity to be performed; (b) if the user has spoken any stored context-specific name for a registered smart device; (c); contextual situations associated with the voice command event; and (d) if any location for the activity is identified. The AI voice response system then identifies one or more appropriate smart devices to execute the activity. After the activity is executed, the AI voice response system analyzes a user's reactions to the activity to determine if any corrections (e.g., manual corrections) were made by the user and to determine if any updates are needed to a knowledge database of the context-specific names.

A smart environment (e.g., smart home) may have multiple registered smart devices, including multiple smart devices of the same type (e.g., multiple smart televisions). For example, a smart home may have four bedrooms and a living room, each with their own smart television. Typically, voice commands to initiate functions of registered smart devices require identification of the smart device using a predetermined name registered with a smart device controller. It may be difficult for a user to remember the predetermined names for each smart device within a smart environment, and an ambiguous voice command from a user may result in a smart controller initiating a function at the wrong smart device.

Moreover, smart devices may change location within a smart environment. In this case, a voice command may cause the wrong device to perform a function. For example, a voice command to turn on a living room television may turn on a television in a bedroom if the television previously associated with the living room has been relocated to the bedroom. Advantageously, embodiments of the present invention address these technical problems of smart environments by providing a method and system by which a smart device controller can analyze the context of a voice comment/request and execute the voice command in an appropriate smart device(s) based on stored context-specific names for the smart devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
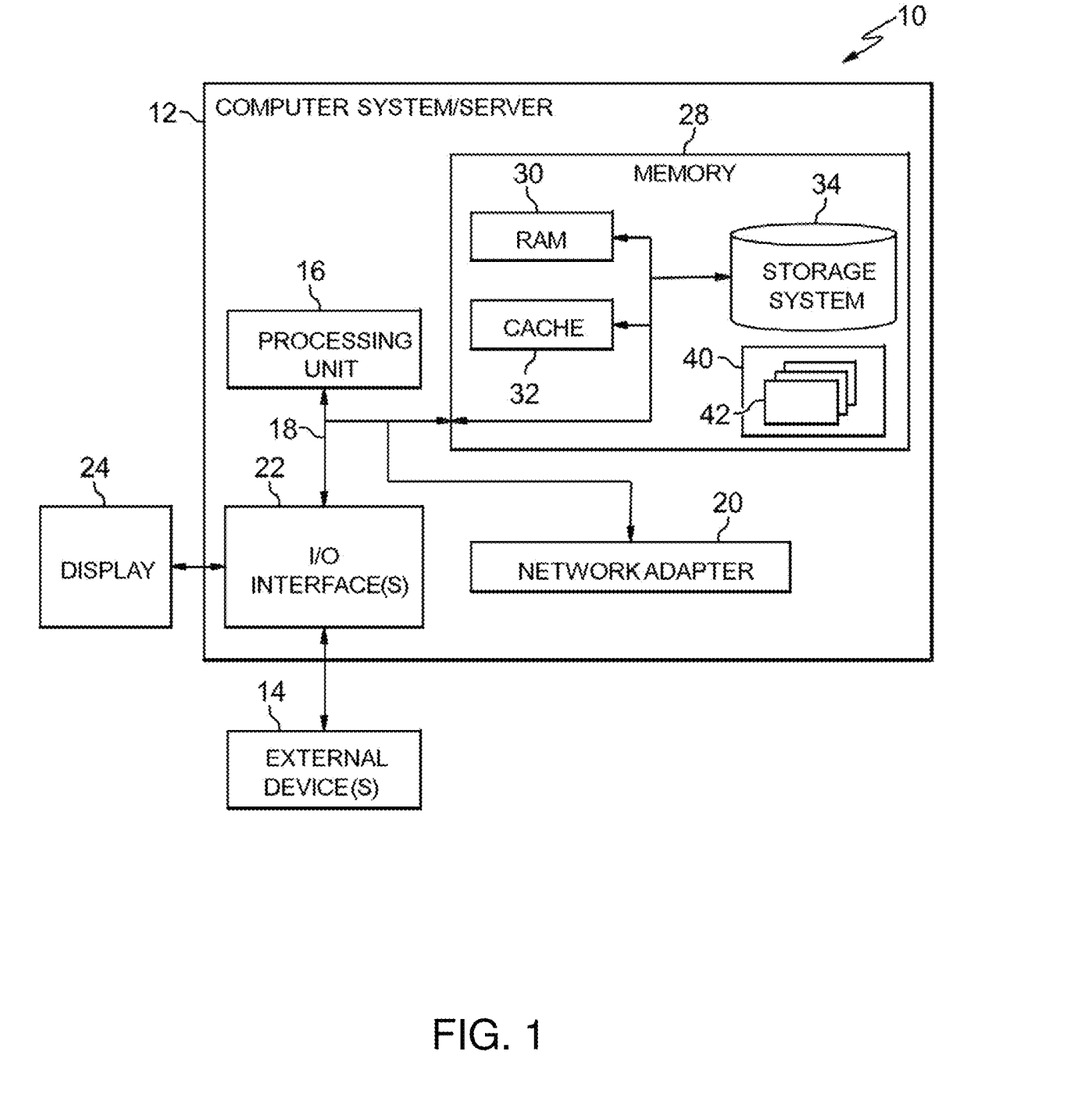
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
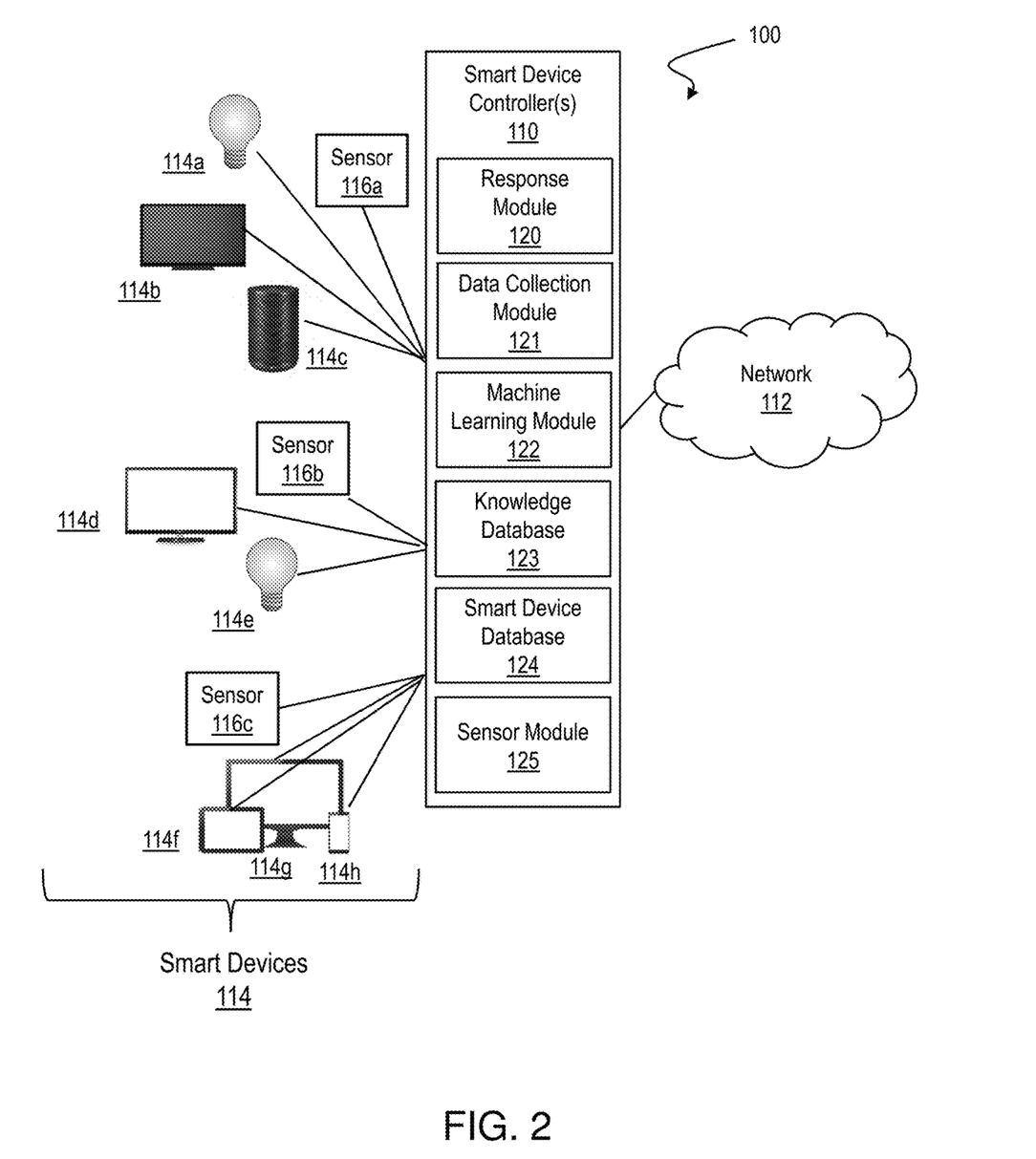
FIG. 2 shows an exemplary environment in accordance with aspects of the invention.

FIG. 2 shows an exemplary smart environment 100 in accordance with aspects of the invention. The smart environment 100 includes one or more smart device controllers 110 in communication with a network 112 (e.g., Internet) and a plurality of smart devices 114. The smart device controller 110 may be configured to implement functions automatically and/or based on user input (e.g., voice commands). The smart device controller 110 may include components of the computing device 12 of FIG. 1 and may be in the form of special computing devices (e.g., personal assistant device) configured to control automated functions of smart devices 114 in the smart environment 100. For example, a smart device controller 110 may be configured to initiate functions of one or more smart devices 114 in a smart home or smart business environment via wired or wireless communication.

The network 112 may be any suitable communication network or combination of networks, such as a local area network (LAN), a general wide area network (WAN), and/or a public network (e.g., the Internet). In embodiments, the one or more smart device controllers 110 of the smart environment 100 are in communication with one or more remote servers (not shown) via the Internet.

The term smart environment as used herein refers to a location (e.g., a home or building) including one or more smart devices 114 (e.g., IOT devices) controlled by one or more smart device controllers 110 via a network connection (e.g., wired connections, wireless connections, or combinations thereof), wherein functions of the one or more smart devices 114 may be controlled by the one or more smart device controllers 110 based on stored rules and/or input of users. Examples of smart devices 114 that may be utilized in a smart environment 100 include lighting or lighting controls (e.g., 114a, 114e), smart televisions (e.g., 114b, 114d, 114g), smart speakers (e.g., 114c), smart phones (e.g., 114h), and tablets (e.g., 114g). Smart devices 114 may each include components of the computing device 12 of FIG. 1, including one or more program modules (e.g., program module 42 of FIG. 1) configured to receive commands from the one or more smart device controllers 110 and initiate functions of the respective smart devices 114 based thereon. Embodiments of the invention are not intended to be limited to the exemplary smart devices 114 discussed herein, and a variety of different types of smart devices 114 could be utilized.

In implementations, a plurality of smart device controllers 110 may be associated with a particular location (smart environment 100). For example, embodiments of the invention may utilize smart device controllers 110 including a smartphone and personal computer each configured to remotely control lighting, heating, electrical devices or other smart devices 114 within the smart environment 100. Moreover, a smart device controller 110 may be part of a smart device 114 itself or may be a separate part of a smart device system, such as a stand-alone personal assistant device for a smart home system.

Each smart device controller 110 may include one or more program modules (e.g., program module 42 of FIG. 1) configured to perform one or more functions described herein. In embodiments, the smart device controller 110 includes a response module 120 (e.g., an AI voice response system) configured to receive and process user commands (e.g., voice commands) from one or more users and save user command event data in the data collection module 121. Personal assistant tools and methods may be utilized by the smart device controller 110 in accordance with embodiments of the invention to understand user input commands and execute the performance of those commands at one or more smart devices 114.

In aspects, a machine learning module 122 of the smart device controller 110 is configured to analyze the user command event data and create and/or update a knowledge database 123 based thereon. In implementations, the knowledge database 123 comprises context-specific names of the smart devices 114, wherein the names are associated with the smart devices 114 and one or more context parameters such as a location of a smart device 114, a location of a user, the identity of a user, a time of day, an action to be taken, etc.

In embodiments, the smart device controller 110 includes a smart device database 124 including registration information of the user and information regarding smart devices 114 within the smart environment 100. In some implementations, the smart device database 124 and the knowledge database 123 are combined, while in other implementations the databases 123 and 124 are separate. In aspects, the smart device controller 110 includes a sensor module 125 configured to receive sensor data from one or more sensors 116a-116c in the smart environment 100. The sensors 116a-116c may be sensors incorporated into one or more of the smart devices 114 and/or the smart device controllers 110 or may be separate sensors utilized by the smart device controller 110 to gather context data (e.g., a location of the user, etc.). Various types of smart environment sensors may be utilized by the smart device controllers 110 in accordance with embodiments of the invention, such as presence sensors of smart thermostat systems, data from home security systems, data from mobile devices within the smart environment 100 (e.g., smartphones) indicating a location of a user, or the like.

In embodiments, the one or more smart device controllers 110 may include additional or fewer components than those shown in FIG. 2. In embodiments, separate components may be integrated into a single computing component or module. For example, the knowledge database 123 and the smart device database 124 may be combined. Additionally, or alternatively, a single component may be implemented as multiple computing components or modules. Further, the quantity of devices and/or networks in the smart environment 100 is not limited to what is shown in FIG. 2. In practice, the environment 100 may include additional devices and/or networks; fewer devices and/or networks; different devices and/or networks; or differently arranged devices and/or networks than illustrated in FIG. 2. Devices of the smart environment 100 may interconnect via wired connections, wireless connections, or a combination of wired and wireless connections.

Figure 3:
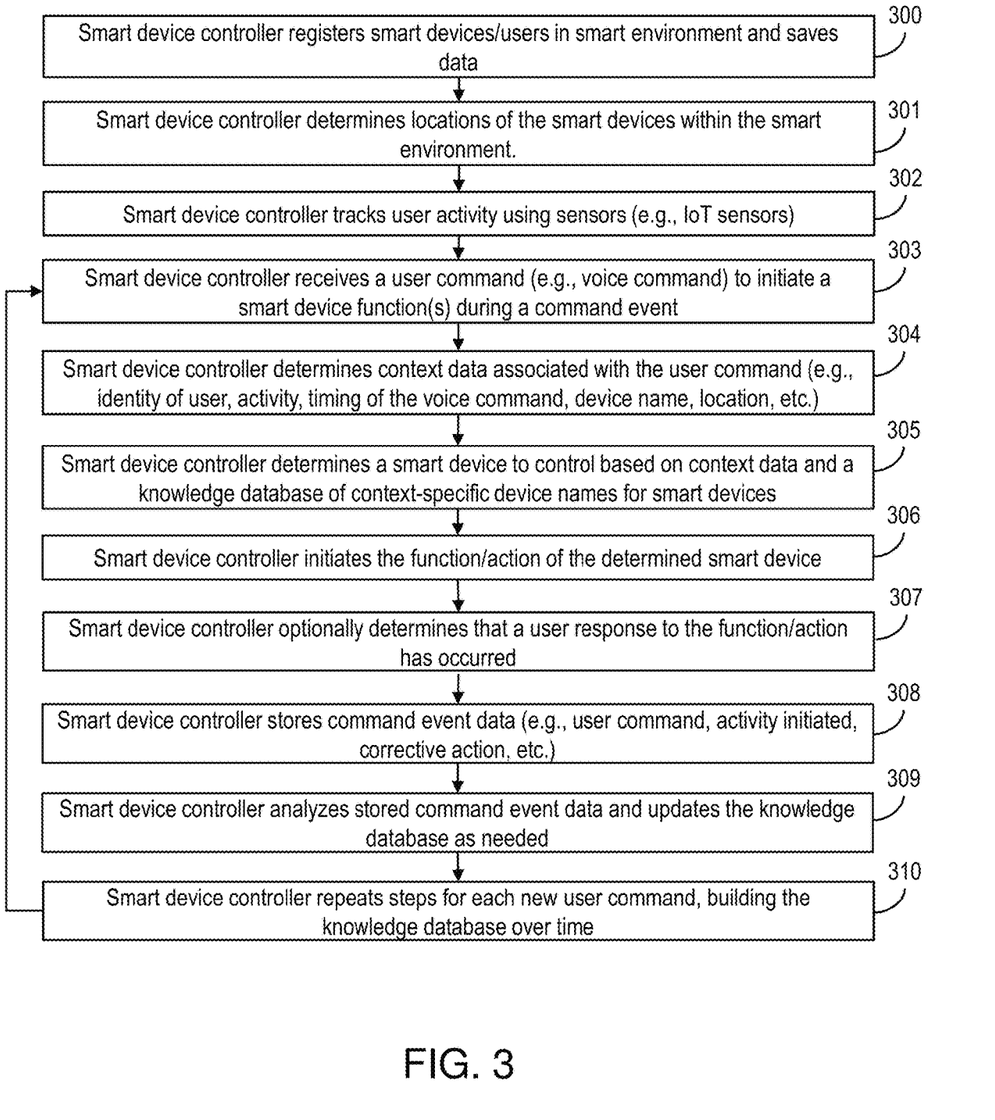
FIG. 3 shows an exemplary flowchart of steps of a method in accordance with aspects of the invention.

FIG. 3 shows an exemplary flowchart of steps of a method in accordance with aspects of the invention. Steps of the method of FIG. 3 may be performed in the environment illustrated in FIG. 2 and are described with reference to elements shown in FIG. 2. Although multiple smart device controllers 110 may be utilized, a sole smart device controller 110 is referenced with respect to FIG. 3 for the sake of simplicity.

At step 300, the smart device controller 110 registers smart devices 114 in the smart environment 100. For example, a user may enter registration information for smart devices 114a-114h with the smart device controller 110, such as through the use of a personal computer device (e.g., tablet 114d or the like. In another example, smart devices 114 may have an automatic registration function, wherein controllers of respective smart devices 114 communicate registration information regarding the smart devices 114 to the smart device controller 110, either when prompted by the smart device controller 110 or based on internal rules/functions (e.g., based on an initial device setup protocol). In implementations, the smart device controller 110 saves registration information in the smart device database 124. Registration information may include, for example, user authorization information (e.g., which users have permissions to access smart devices 114 or smart device functionality), user identification information (e.g., voice recognition information for users, facial recognition data for users), smart device type (e.g., smart television, smart speaker, etc.), smart device identification (ID), initial locations of smart devices 114 (e.g., zone 1 of 5), or other information useful in the identification of a smart device 114 or in the identification of a user of the smart environment 100. In implementations, the data collection module 121 implements step 300.

At step 301, the smart device controller 110 determines locations of the smart devices within the smart environment 100. In implementations, the smart device controller 110 of the smart device controller 110 locates relative positions of smart devices 114 with respect to the smart device controller 110. In implementations, the smart device controller 110 identifies the relative positions of the smart devices 114 based on defined area boundaries (e.g., there are four bedrooms within the smart environment 100, and each bedroom is identified uniquely). In aspects, the smart device controller 110 identifies the relative locations of the smart devices 114 based on IoT sensor detection strength analysis (e.g., the relative strength of wireless signals between the smart device controller 110 and respective smart devices 114). Various tools and techniques for calculating relative locations of smart devices 114 with respect to the smart device controller 110 may be utilized in implementations of the invention. In implementations, the sensor module 125 of the smart device controller 110 implements step 301.

At step 302, the smart device controller 110 tracks user activity using sensors (e.g., sensors 116a, 116b, and 116c) within the smart environment 100. For example, sensors 116a, 116b, and 116c may be stand-alone sensors or sensors incorporated in respective smart devices 114 or within the smart device controller 110, configured to sense the presence of a user within a predetermined distance of the sensor. In embodiments, the smart device controller 110 tracks a user's entrance and exit to and from various rooms or zones within the smart environment 100 based on sensor data (e.g., IoT sensor data). In one example, a sensor 116a is a motion detecting sensor that is part of a smart thermostat. In another example, the sensor 116c is a global positioning system (GPS) device that is part of a personal computing device of a user (e.g., smartphone, smartwatch, etc.) that is in communication with the smart device controller 110. Various user location detecting techniques and tools may be utilized by the smart device controller 110 to determine a position of a user within the smart environment 100. In embodiments, IoT sensors within the smart environment 100 are configured to identify an activity a user is performing (e.g., hand gesture pattern, mobility pattern, etc.), and the smart device controller 110 can obtain data from the various IoT sensors to identify the activity of the user. In implementations, the sensor module 125 of the smart device controller 110 implements step 302.

At step 303, the smart device controller 110 receives a user command (e.g., voice command) to initiate one or more functions of one or more smart devices 114 within the smart environment 100 during a command event. Various user-input tools and techniques may be utilized by the smart device controller 110 in the implementation of step 303. For example, a user may give a voice command to the smart device controller 110 to "turn on the television" or "play music". Alternatively, a user may input a command through a user interface of a personal computing device (e.g., smartphone 114h). The smart device controller 110 may utilized speech-to-text techniques to convert audio data to text, and natural language processing tools and techniques may be utilized by the smart device controller 110 to determine the meaning and context of the user command. In embodiments, the response module 120 implements step 303. In implementations, the response module 120 comprises an AI voice response module.

At step 304, the smart device controller 110 determines context data associated with the user command. For example, the smart device controller 110 determines one or more of the following: an identity of the user, an activity or function to be performed, timing of the command (e.g., morning, afternoon), a smart device name (e.g., "my TV"), a location of the activity or function to be performed within the smart environment 100, and a location of the user within the smart environment 100 at the time of the user command. In implementations, the smart device controller 110 utilizes speech recognition technology to identify which user of a plurality of registered users initiated a voice command at step 303. In embodiments, the smart device controller 110 accesses a clock to determine a time of the user command. In aspects, the smart device controller 110 utilizes natural language processing techniques to identify words in the user command associated with a location within the smart environment 100 (e.g., a room or zone), a name of a smart device (e.g., television), and/or an activity or function to be performed (e.g., turning on the smart device). In embodiments, the response module 120 of the smart device controller 110 implements step 304.

At step 305, the smart device controller 110 determines one or more smart devices 114 to control based on context data gathered by the smart device controller 110 and the knowledge database 123, wherein the knowledge database 123 includes context-specific names for the one or more smart devices 114 organized by registered user. The term "name" as used herein refers to a term or terms (e.g., a noun) utilized by a user to refer to a particular smart device 114. The term "context-specific name" as used herein refers to a name of a smart device that is associated with one or more context parameters (context parameter data) associated with user commands. It can be understood that in different historical user interactions with the smart device controller 110, a user may call a smart device by different names. For example, a first user may refer to a smart television 114b in more than one way. In this example, the first user may refer to the smart television 114b in a voice command as "my favorite TV", "study room TV", "small TV", etc. In another example, during a voice command, a user may refer to a mobile smart speaker 114c as "the living room speaker", "the bedroom speaker", "the home speaker", etc., depending on which room/zone of the smart environment 100 the mobile smart speaker is currently located in, and/or the current location of the user. In implementations, the knowledge database 123 stores context-specific names along with associated context parameters (context parameter data), wherein the context-specific names are learned over time by the smart device controller 110. Context parameter data may include an identity of a user, a location of the smart device 114, a location of a user, a time of day, and/or a function/action to be performed (by one or more smart devices 114), for example.

In aspects, the determining one or more smart devices 114 to control at step 305 includes determining a location of a function/action to be performed (i.e., performance location) by one or more smart devices 114 based on context data derived from the user command and a location of the user within the smart environment 100. For example, the smart device controller 110 may utilize user tracking data generated at step 302 to determine that the user is within a first bedroom when issuing a user command to "turn on the television", wherein the smart device controller 110 determines that the user wishes to turn on the television in the first bedroom based on the user's location at the time of the command.

In implementations, the determining the one or more smart devices 114 to control at step 305 includes determining the type of activity/function the user wishes to be performed, the time of day, and the user issuing the command. In one example, a user issues the following voice command "I will study now, please prepare the environment." In this example, the smart device controller 110 determines the timing of the voice command from the context data of step 304, identifies the user based on the context data, determines the activity the user wishes to activate based on the context data, understands from this information that the user will be studying in a study room within the smart environment 100, and knows to initiate activities/functions in smart devices 114 within the study room of the smart environment 100 based on stored activity rules (e.g., pre-set parameters for smart devices 114 within the study room, such as music settings, light settings, temperature settings, etc.). In embodiments, the response module 120 of the smart device controller 110 implements step 305.

At step 306, the smart device controller 110 initiates the function/action to be taken at the one or more smart devices 114 determined at step 305. In implementations, the smart device controller 110 sends instructions to the one or more smart devices 114 based on the user command received at step 303, wherein the instructions cause the one or more smart devices 114 to initiate the function/action. In one example, the smart device controller 110 sends instructions to a smart television 114b based on a user command to "turn on my TV" when the user is within a first bedroom. In this case, the smart device controller 110 recognizes at step 305 that the user is referring to the smart television 114b in a first bedroom based on the user being within the first bedroom (context data) and the knowledge database 123 listing the context-specific name "my TV" with associated user location data (the first bedroom) for the smart television 114b.

At step 307, the smart device controller 110 optionally determines that a user response to the initiated function/action has occurred. In implementations, the user response is a corrective action. The term corrective action refers to a follow-up command of a user in response to the function/action initiated at step 306 to change the function/action. In one example, the user initiates a corrective action (e.g., user voice command) that cancels or stops the function/action initiated at step 306. In another example, the smart device controller 110 determines that the user has manually performed a corrective action to cancel or stop the function/action initiated at step 306 (e.g., the user manually turns off the smart television 114b). In some embodiments, when a user submits any voice command, an AI voice response system (e.g., response module 120) of the smart device controller 110 executes a function/activity based on available information (context data and data from the knowledge database 123) and automatically tracks the user's reaction (e.g., a change in biometric parameters of the user, manual correction of the function/activity by the user, etc.). In one example, the smart device controller 110 is configured to recognize when biometric data of a user (e.g., from a networked smartwatch of the user) indicates displeasure of the user with the activity/function performed, such as via elevated heartrate levels. In embodiments, the response module 120 implements step 307.

At step 308, the smart device controller 110 stores command event data in the knowledge database 123. The command event data may include text data of the user command (e.g., derived using speech-to-text techniques), the activity/function initiated at step 306, user corrective actions taken, and context data associated with the user command determined at step 304. In embodiments, the smart device controller 110 stores command event data for each command event over time, thereby developing a historic database of command event data. In embodiments, the data collection module 121 implements step 308.

At step 309, the smart device controller 110 analyzes the stored command event data and updates the knowledge database 123 as needed. In implementations, the smart device controller 110 updates the knowledge database 123 by: adding a new context-specific name for a registered smart device 114; deleting a stored context-specific name for a registered smart device 114; or updating a stored context-specific name for a registered smart device 114 (e.g., updating context parameters for the context-specific name). In embodiments, the smart device controller 110 analyzes the user responses (e.g., corrective actions) performed by user (e.g., manually switched on an air conditioning (AC) system) in the historic command event data to determine if the knowledge database 123 needs to be updated. In one example, the smart device controller 110 determines that a stored context-specific name for a registered smart device 114 is incorrect when the smart device controller 110 determines at step 307 that a user corrective action has been taken with respect to a smart device 114 selected at step 305. In this example, the smart device controller 110 learns that the smart television 114b selected at step 305 was not correct when the user turned off the selected smart television 114b and turned on another smart device 114 (e.g., smart television 114d) instead. Accordingly, the smart device controller 110 updates the knowledge database 123 to reflect the context parameters associated with the smart television 114*b* and smart television 114*d*.

In another example, the smart device controller 110 learns over time new combinations of terms utilized by a particular user in a given context. In implementations, the smart device controller 110 utilizes an unsupervised clustering model to analyze the stored command event data and recognizes smart devices 114 associated with different contextual situations, and their context-specific names. For example, the smart device controller 110 may analyze the stored command event data and determine that a first user has a pattern of using the term "my TV" to turn on a television located in a living room of a home, while a second user has a pattern of using the term "big TV" when turning on the television located in the living room of the home. In embodiments, the smart device controller 110 identifies a noun in a user's command (e.g., television), and if the noun is not previously defined in the knowledge database 123, the smart device controller 110 updates the knowledge database 123 with the noun and associated context data to create a new context-specific name for the smart device 114 associated with the user command. In embodiments, the machine learning module 122 of the smart device controller 110 implements step 309.

At step 310, the smart device controller 110 repeats steps 303-309 for each new user command (e.g., voice command) within the smart environment 100, thus building and updating the knowledge base 123 over time. Thus, embodiments of the invention provide for a continuously evolving knowledge corpus using machine intelligence to provide a more user-responsive smart environment 100.

Figure 4:
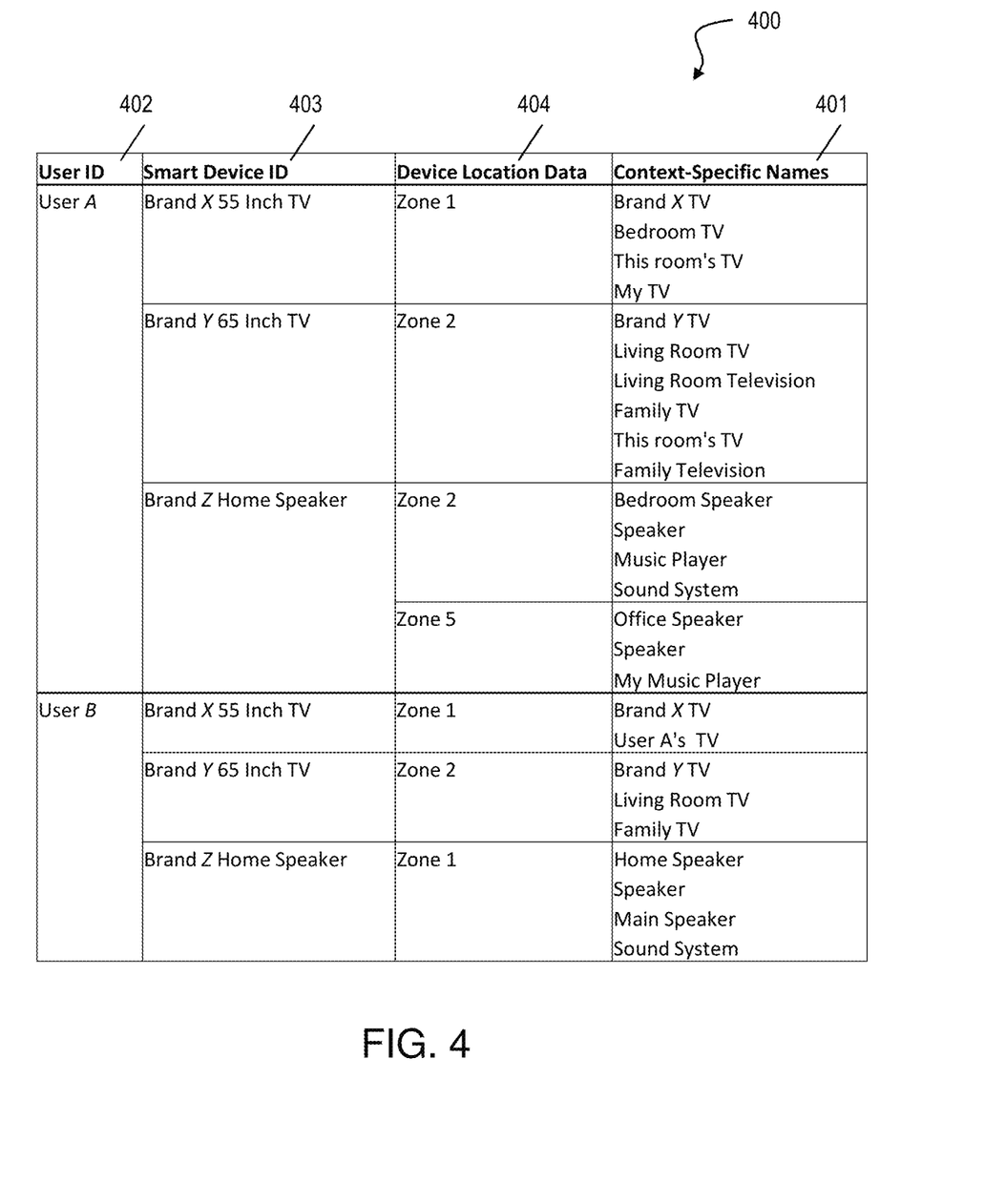
FIG. 4 shows exemplary data columns in a knowledge database in accordance with aspects of the invention.

FIG. 4 shows exemplary data columns in a knowledge database in accordance with aspects of the invention. The data columns of FIG. 4 may be part of the knowledge database 123 depicted in FIG. 2.

As depicted in FIG. 4, columns 400 of the knowledge database 123 organize context data by user, such that the smart device controller 110 can look up context-specific names 401 for registered smart devices 114 by user. In the example of FIG. 4, users are identified by user identification (ID) data 402, which may include voice recognition data, username or login data, facial recognition data, or other types of user identification data. In implementations, an artificial intelligence (AI) voice response system (e.g., response module 120) of the smart device controller 110 is configured to identify each and every user of the smart environment 100 individually based on spoken texture, or any other recognition methods such as facial recognition, mobile device pattern, etc.

Additionally, the knowledge database 123 of FIG. 4 includes smart device ID data 403 for each smart device 114 registered with the smart device controller 110. The smart device ID data 403 may include data regarding a type of the smart device 114 (e.g., a smart television, a smart appliance, a smart lighting system, etc.), a model name and/or number, or other identifying information. In embodiments, each smart device 114 within the smart environment 100 is identified uniquely, and an appropriate name for each smart device 114 is given to the devices as per home network IoT device configurations. The knowledge database 123 of FIG. 4 also stores device location data 404 for registered smart devices 114 within the smart environment 100, wherein the device location data is associated with context-specific names of registered smart devices 114.

Figure 5:
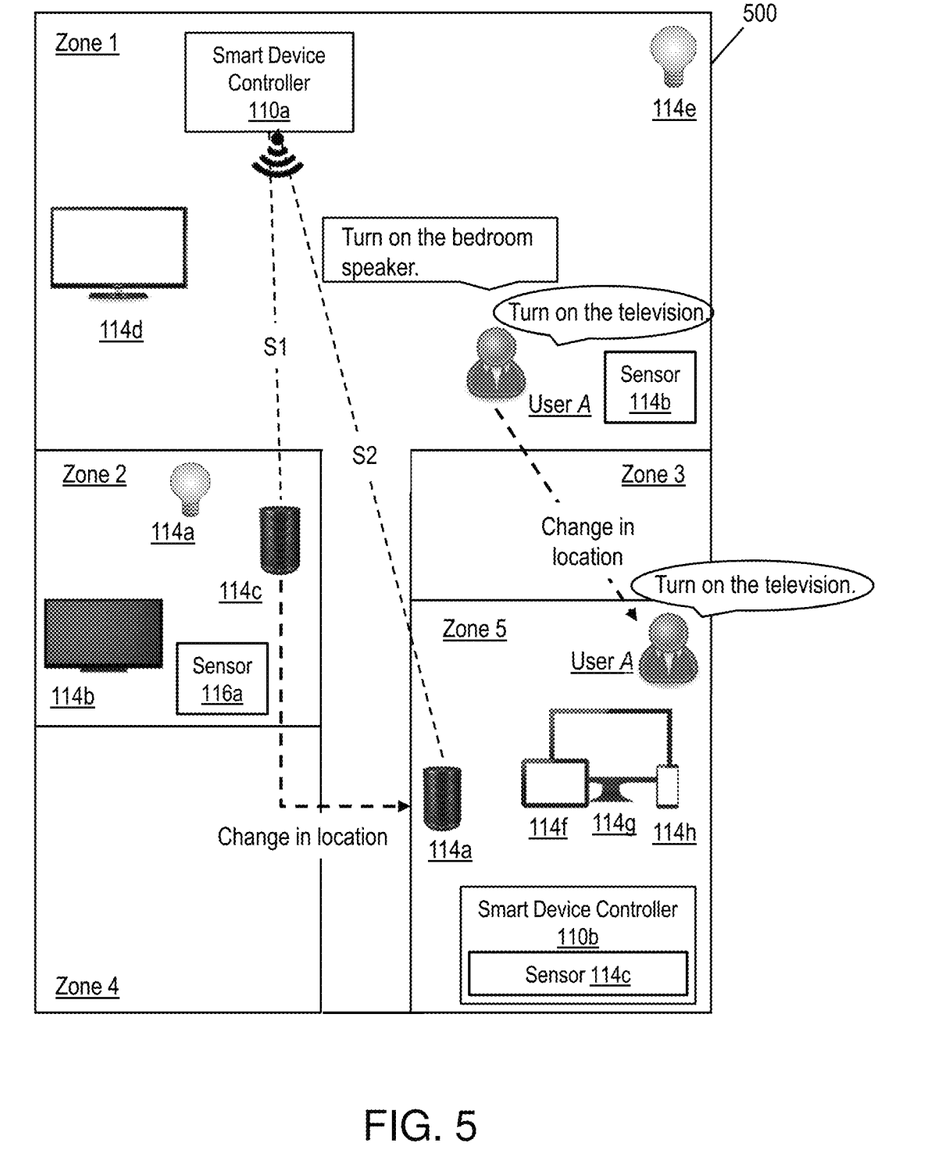
FIG. 5 shows an exemplary use scenario in accordance with aspects of the invention.

In the example of FIG. 4, a smart environment 100 includes a first television "Brand X 55 Inch TV" in a first location (Zone 1) within the smart environment 100, and a second television "Brand Y 65 Inch TV" in a second location (Zone 2) within the smart environment 100. The smart device controller 110 can recognize, based on the knowledge database 123, that User A refers to the first television by different context-specific names than User B, and can also recognize that the User A refers to the first television by different context-specific names than the second television. Moreover, the smart device controller 110 can recognize, based on the knowledge database 123, that a Brand Z Home Speaker is referred to differently by User A when it is in a first location (Zone 1) than when it is located in a second location (Zone 2). In the case of an ambiguous name, such as "Speaker", the smart device controller 110 may solve the ambiguity based on other context data, such as where the user is located within the smart environment 100 when issuing the user command. For example, if the user is in Zone 2 when issuing a command "turn on the Speaker", the smart device controller 110 may determine that the user wishes to turn on the Brand Z Home Speaker currently located within Zone 2. While the example of FIG. 4 only shows user IDs 402, smart device IDs 403, and device location data 404 associated with context-specific names 401, other context data associated with context-specific names can be saved in the knowledge database 123 for use by the smart device controller 110, and the invention is not intended to be limited by the examples discussed herein, FIG. 5 shows an exemplary use scenario in accordance with aspects of the invention. Steps discussed with respect to FIG. 5 may be performed in the environment illustrated in FIG. 2 and utilizing the steps of FIG. 3.

In the scenario of FIG. 5, a smart device controller 110*a* determines respective locations of a plurality of smart devices 114*a*-114*h* within a smart home environment 500. In this example, the smart device controller 110*a* utilizes the relative signal strength (S1 and S2) of wireless signals of the networked smart devices 114*a*-114*h* to determine relative locations of each smart device within the smart home environment 500 and store the locations in the knowledge database 123. The smart device controller 110*a* then receives a user voice command "turn on the television" from User A, regarding a first function to be performed (turning on the smart device) during the command event.

The smart device controller 110*a* determines context data based on the user voice command using natural language processing, the context data including an identification of the user (User A) using voice recognition techniques, the function to perform ("turning on"), and a smart device name ("the television"). In the example of FIG. 5, the smart device controller 110*a* also determines context data regarding the location (Zone 1) of User A within the smart home environment 500. The smart device controller 110*a* determines a select smart device (114*d*), from the plurality of smart devices (114*a*-114*h*), to perform the function based on the context data and the knowledge database 123 listing context-specific names for the plurality of smart devices 114*a*-114*h*, wherein the context-specific names are associated with the User A in the knowledge database 123. In some cases, the context-specific names in a knowledge database 123 may be specific to a user, while in other cases multiple users may share the same name for a specific smart device 114.

Still referencing FIG. 5, the smart device controller 110*a* initiates the function at the selected smart device 114*d* (e.g., causes the smart device 114*d* to turn on), and stores event data for the command event in the knowledge database 123. The smart device controller 110*a* then automatically updates the knowledge database 123 based on the event data. In this example, the user command is the first use of the term "the television" by User A, and the smart device controller 110a adds the context-specific name "the television" to the knowledge database 123 associated with User A, along with context data associated with the user command (e.g., location of User A, the function, and the location of the smart device 114d. In this example, User A moves from Zone 1 to Zone 5 within the smart home environment 500, and the same user command "turn on the television" results in the smart device controller 110a determines that a different smart device 114g should be turned on, based on the context data (including location data indicating that User A is in Zone 5) matching the smart device 114g in the knowledge database 123. Accordingly, embodiments of the invention enable the smart device controller 110 to automatically choose to initiate a function in one of several smart devices 114 of the same device type (e.g., smart televisions) based on data in the knowledge database 123.

In another example depicted in FIG. 5, User A issues a voice command to "turn on the bedroom speaker". In this scenario, a smart device controller (e.g., 110a, 110b) of the smart home environment 500 understands that the user is referring to the registered smart speaker 114c when the smart speaker 114c is located within a bedroom (e.g., Zone 2). In this example, the name "the bedroom speaker" is a context-specific name in in the knowledge database 123 associated with scenarios where the smart speaker 114c is located in the bedroom (Zone 2). Another context-specific name may be associated with the smart speaker 114c when it is in an office (Zone 5), such as "the office speaker".

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for automatic contextual selection of a smart device. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a smart device controller, a user voice command from a user during a command event within a smart environment, the smart environment including a plurality of registered smart devices;
   receiving, by the smart device controller, context data from one or more sensors, wherein the context data is associated with the user voice command;
   determining, by the smart device controller, a smart device name from the user voice command;
   accessing, by the smart device controller, a knowledge database including the registered smart devices and sets of context-specific names for the registered smart devices for a plurality of users, wherein each of the context-specific names in the sets of context-specific names is associated with context parameters, wherein each set of context-specific names in the sets of context-specific names is based on historic event data for one of the plurality of users, and wherein different ones of the plurality of users are associated with different sets of context-specific names for the registered smart devices;
   matching, by the smart device controller, the smart device name from the user voice command with one of the context-specific names of the knowledge database associated with the user based on the context data matching the context parameters associated with the one of the context-specific names;
   automatically choosing, by the smart device controller, a select smart device from the plurality of registered smart devices based on the matching the smart device name with the one of the context-specific names; and
   initiating, by the smart device controller, a function at the select smart device based on the voice command.

2. The computer-implemented method of claim 1, further comprising:
   storing, by the smart device controller, event data for the command event with historic event data from a plurality of previous command events, the event data including the context data; and
   automatically updating, by the smart device controller, one of the sets of context-specific names for the registered smart devices associated with the user in the knowledge database based on the historic event data.

3. The computer-implemented method of claim 1, further comprising:
   determining, by the smart device controller, that the user has taken a corrective action with respect to the initiated function; and
   automatically updating, by the smart device controller, a context-specific name of the select smart device or contextual data of the select smart device associated with the user in the knowledge database based on the corrective action.

4. The computer-implemented method of claim 1, further comprising determining, by the smart device controller, a performance location of the function based on the context data, wherein the performance location matches one of the context parameters of the select smart device in the knowledge database.

5. The computer-implemented method of claim 1, further comprising determining, by the smart device controller, a location of the user within the smart environment, wherein the location of the user matches one of the context parameters of the select smart device in the knowledge database.

6. The computer-implemented method of claim 1, wherein the select smart device is chosen from a plurality of registered smart devices of a same type as the select smart device.

7. The computer-implemented method of claim 1, wherein the context parameters are selected from one or more of the group consisting of: a location of the select smart device; a location of the user; a performance location of the function; an identity of the user; and a time associated with the user voice command.

8. A computer program product comprising one or more computer readable storage media and program instructions collectively stored on the one or more computer readable storage media, the program instructions executable by a computing device to cause the computing device to:
receive a user command from a user during a command event within a smart environment, the smart environment including a plurality of registered smart devices;
identify the user;
obtain context data from one or more sensors, wherein the context data is associated with the user command;
determine a smart device name from the user command;
access data of the identified user in a knowledge database, wherein the knowledge database includes data for multiple users, wherein the data for each of the multiple users includes data regarding the registered smart devices and a set of context-specific names for the registered smart devices, and wherein each of the context-specific names in the set of context-specific names is associated with context parameters;
match the smart device name with one of the context-specific names in the set of context-specific names associated with the user based on the context data matching the context parameters associated with the one of the context-specific names;
automatically choose a select smart device from the plurality of registered smart devices based on the matching the smart device name with the one of the context-specific names; and
initiate a function at the select smart device based on the user command.

9. The computer program product of claim 8, wherein the program instructions further cause the computing device to:
store event data for the command event with historic event data from a plurality of previous command events, the event data including the context data; and
automatically update the knowledge database based on the historic event data.

10. The computer program product of claim 8, wherein the program instructions further cause the computing device to:
determine that the user has taken a corrective action with respect to the initiated function; and
automatically update one of the context-specific names of the select smart device or contextual data of the select smart device associated with the user in the knowledge database based on the corrective action.

11. The computer program product of claim 8, wherein the context data includes a performance location of the function, and the performance location matches one of the context parameters of the select smart device in the knowledge database, and wherein the context parameters include different performance locations associated with different ones of the context-specific names for the select smart device.

12. The computer program product of claim 8, wherein the context data includes a location of the user within the smart environment, and the location of the user matches one of the context parameters of the select smart device in the knowledge database, and wherein the context parameters include different locations of the user associated with different ones of the context-specific names for the select smart device.

13. The computer program product of claim 8, wherein the select smart device is chosen from a plurality of registered smart devices of a same type as the select smart device, wherein the registered smart devices have a same smart device name.

14. The computer program product of claim 8, wherein the context parameters are selected from one or more of the group consisting of: a location of the select smart device; a location of the user; a performance location of the function; an identity of the user; and a time associated with the user voice command.

15. A system comprising:
a processor, a computer readable memory, and one or more computer readable storage media associated with a computing device;
program instructions to receive a user command from a user during a command event within a smart environment, the smart environment including a plurality of registered smart devices in communication with the computing device;
program instructions to determine relative locations of the plurality of registered smart devices within the smart environment;
program instructions to determine a smart device name associated with the user command;
program instructions to obtain context data from one or more sensors, wherein the context data is associated with the user command;
program instructions to access data in a knowledge database including data regarding the registered smart devices and sets of context-specific names for the registered smart devices for a plurality of users, wherein each of the context-specific names of the sets of context-specific names is associated with context parameters, and wherein each set of context-specific names in the sets of context-specific names is based on historic event data for one of the plurality of users;
program instructions to match the smart device name with one of the context-specific names in the knowledge database associated with the user based on the context data matching the context parameters associated with the one of the context-specific names;
program instructions to automatically choose a select smart device from the plurality of registered smart devices based on the matching the smart device name with the one of the context-specific names; and
program instructions to initiate a function at the select smart device based on the user command,
wherein the program instructions are collectively stored on the one or more computer readable storage media for execution by the processor via the computer readable memory.

16. The system of claim 15 further comprising:
program instructions to store event data for the command event with historic event data from a plurality of previous command events, the event data including the context data; and program instructions to correlate context data from the historic event data with context-specific names of the plurality of registered smart devices; and program instructions to automatically update the knowledge database based on the historic event data, wherein the updating is selected from the group consisting of: adding a new context-specific name for one of the plurality of registered smart devices, deleting a stored context-specific name for one of the plurality of registered smart devices, and updating a stored context-specific name for one of the registered smart devices.

17. The system of claim 15 further comprising:

program instructions to determine that the user has taken a corrective action with respect to the initiated function; and program instructions to automatically update a context-specific name of the select smart device or contextual data of the select smart device associated with the user in the knowledge database based on the corrective action.

18. The system of claim 15 wherein the context data is selected from one or more of the group consisting of: a location of the select smart device; a location of the user; a performance location of the function; an identity of the user; and a time associated with the user voice command.

19. The system of claim 15, wherein the context parameters are selected from one or more of the group consisting of: a location of the select smart device; a location of the user; a location of the function to be performed; an identity of the user; and a time associated with the user voice command.

20. The system of claim 15, wherein the select smart device is chosen from a plurality of registered smart devices of a same type as the select smart device.

* * * * *